(No Model.)

J. E. GARSIDE.
SCOOP BOARD FOR WAGONS.

No. 367,615. Patented Aug. 2, 1887.

Witnesses
Norris A. Clark.
F. W. Combs.

Inventor
John E. Garside
per Hallock & Hallock
Attys.

UNITED STATES PATENT OFFICE.

JOHN E. GARSIDE, OF PEORIA, ILLINOIS.

SCOOP-BOARD FOR WAGONS.

SPECIFICATION forming part of Letters Patent No. 367,615, dated August 2, 1887.

Application filed March 12, 1887. Serial No. 230,703. (No model.)

*To all whom it may concern:*

Be it known that I, JOHN E. GARSIDE, a citizen of the United States, residing at Peoria, in the county of Peoria and State of Illinois, have invented certain new and useful Improvements in Scoop or Shovel Boards; and I do hereby declare the following to be a full, clear, and exact description of the invention, such as will enable others skilled in the art to which it appertains to make and use the same.

My invention relates to that class of end-gates which can be used as scoop or shoveling boards.

The object of the invention is to provide a shovel-board that can readily be applied to a wagon-box without the aid of skilled labor; and to that end the nature of the invention consists of constructions and combinations, all as will hereinafter be described and claimed, reference being had to the accompanying drawings, in which—

Figure 1:
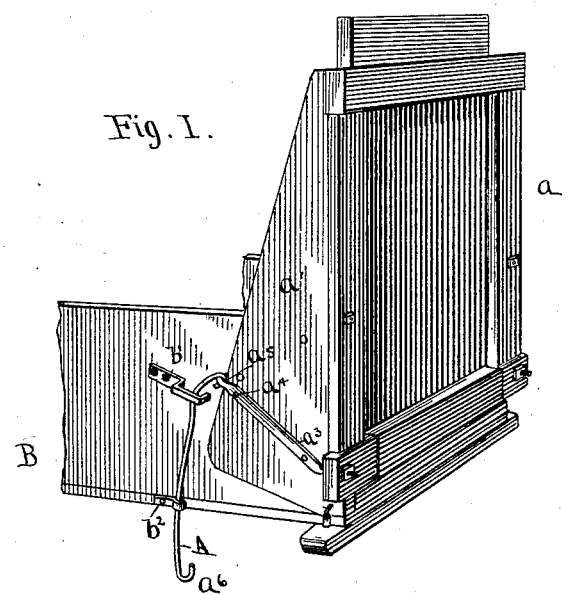
Figure 2:
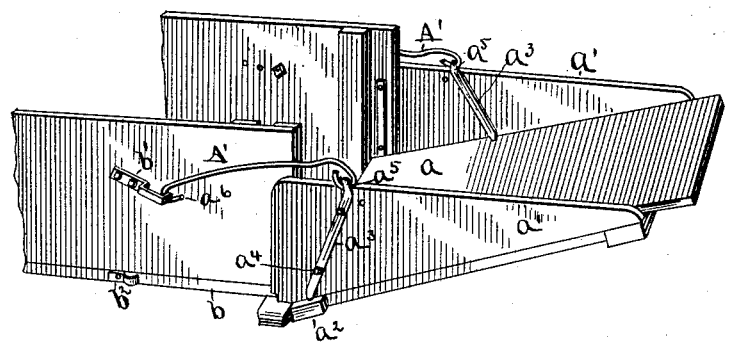
Figure 3:

Figure 1 represents a perspective shovel-board in place; Fig. 2, perspective showing the board ready for use; and Fig. 3, a top view of the locking-catch.

A represents the shovel-board, and B the wagon-box.

The shovel-board may be of any desired form, and consists of the end or bottom $a$, sides $a'$, and cross-bar $a^2$, which projects beyond the sides $a'$, and has secured thereto bars $a^3$, which project obliquely upward toward the box B, and are bent over or returned upon the inside of the side pieces, to which they are secured by rivets or bolts $a^4$, passing through both bent portions and the sides. At the point where the bars are bent around the edges of the sides, a loop, $a^5$, is formed, and to each of which is secured or jointed a lever-bar, A', made of spring metal, and having at the distal end a hook, $a^6$. Upon each side of the box is secured a loop, $b'$, preferably placed obliquely to the upper edge of the box, and through which the spring lever-bar is passed.

When the end-gate is to be used as a shovel-board, the hooks $a^6$ are caught in the front bar of the loop $b'$ and hold the gate in the position shown in Fig. 2; and when to be used to close the end of the wagon the spring lever-bars are drawn through the loop until the end-gate is in position, and then spring into the catch $b^2$ on the bottom board of the box. The spring-bars then act as levers, the loops $b'$ being the fulcrum, and hold the end-gate in place.

By running the bars $a^3$ obliquely from the lower end of the shovel-board upward toward the top of the wagon-box, and providing the spring lever-bars, the loops, and the catches, I dispense with hinges for the end-gate, the lower edge of which rests squarely upon the bottom of box $b$ when in a vertical position and obliquely when tilted. To relieve the sides of the box and the bottom of the strain when the gate is used as a scoop-board, the cross-bar $a^2$ is provided, and when the gate is tilted its lower edge rests upon the ends of the bottom boards of the box.

To attach the end-gate to a wagon, it is only necessary to attach the loops $b'$ and the catches $b^2$ to the sides of the box, set the board or gate upon bottom of box $b$, and insert the spring lever-bars through the loops $b'$, and the device is ready for use either as an end-gate or a shovel-board.

What I claim as new is—

The combination of a box having the loops and catches and the bottom $b$, and an end-gate having the cross-bar $a^2$, the oblique bars $a^3$, and the spring lever-bars having hooked ends, substantially as described.

In testimony whereof I affix my signature in presence of two witnesses.

JOHN E. GARSIDE.

Witnesses:
S. N. KINNEY,
THOS. H. DETWEILLER.